United States Patent
Renaud (10) Patent No.: US 9,605,896 B2
(45) Date of Patent: Mar. 28, 2017

(54) PROCESS FOR TREATING A NATURAL GAS CONTAINING CARBON DIOXIDE

(75) Inventor: Xavier Renaud, Boeil-bezing (FR)

(73) Assignee: TOTAL S.A., Courbevoie (FR)

( * ) Notice: Subject to any disclaimer, the term of this patent is extended or adjusted under 35 U.S.C. 154(b) by 1152 days.

(21) Appl. No.: 13/643,261

(22) PCT Filed: Apr. 28, 2011

(86) PCT No.: PCT/IB2011/051879
§ 371 (c)(1),
(2), (4) Date: Oct. 24, 2012

(87) PCT Pub. No.: WO2011/135538
PCT Pub. Date: Nov. 3, 2011

(65) Prior Publication Data
US 2013/0036765 A1 Feb. 14, 2013

(30) Foreign Application Priority Data
Apr. 29, 2010 (FR) ...................... 10 53340

(51) Int. Cl.
*F25J 3/00* (2006.01)
*F25J 3/02* (2006.01)

(52) U.S. Cl.
CPC .......... *F25J 3/0266* (2013.01); *F25J 3/0209* (2013.01); *F25J 3/0233* (2013.01); *F25J 3/0242* (2013.01);
(Continued)

(58) Field of Classification Search
CPC ...... F25J 3/0209; F25J 3/0266; F25J 2200/70; F25J 2200/74; F25J 2215/80; F25J 2215/60; F25J 3/0233; F25J 2230/80; F25J 2235/80; F25J 1/0095; Y10S 62/929; Y02C 10/12

(56) References Cited

U.S. PATENT DOCUMENTS 2,826,266 A 3/1958 Hachmuth et al.
3,130,026 A * 4/1964 Becker .................. F25J 3/0209
62/634

(Continued)

OTHER PUBLICATIONS

Haut R.C., et al.; "Development and Application of the Controlled-Freeze-Zone Process;" SPE Production of Engineering, The Society, vol. 4, No. 3, Aug. 1, 1989, pp. 265-271.

*Primary Examiner* — Keith Raymond
(74) *Attorney, Agent, or Firm* — Harness, Dickey & Pierce, P.L.C.

(57) ABSTRACT

The disclosure includes a process for treating a natural gas containing carbon dioxide wherein the natural gas is separated by a cryogenic process in order to provide, on the one hand, a stream of liquid carbon dioxide, containing hydrocarbons, and, on the other hand, purified natural gas; at least one part of the natural gas is cooled in a first heat exchanger and then in a second heat exchanger before the cryogenic process and/or before a reflux to the cryogenic process; at least one part of the stream of liquid carbon dioxide is recovered in order to provide a stream of recycled carbon dioxide; the stream of recycled carbon dioxide is divided into a first portion and a second portion; the first portion is expanded and then heated in the first heat exchanger, in order to provide a first stream of heated carbon dioxide; the second portion is cooled, then at least one part of the second portion is expanded and then heated in the second heat exchanger, in order to provide a second stream of heated carbon dioxide; at least some of the hydrocarbons contained in the first stream of heated carbon dioxide and in the second stream of heated carbon dioxide are recovered by liquid/gas separation.

14 Claims, 1 Drawing Sheet

(52) U.S. Cl.
CPC ........ *F25J 2200/02* (2013.01); *F25J 2200/70* (2013.01); *F25J 2200/74* (2013.01); *F25J 2205/02* (2013.01); *F25J 2205/04* (2013.01); *F25J 2215/04* (2013.01); *F25J 2220/84* (2013.01); *F25J 2230/30* (2013.01); *F25J 2230/80* (2013.01); *F25J 2235/80* (2013.01); *F25J 2260/80* (2013.01); *F25J 2270/02* (2013.01); *F25J 2270/80* (2013.01); *F25J 2290/72* (2013.01); *Y02C 10/12* (2013.01)

(58) Field of Classification Search
USPC .......................................................... 62/929
See application file for complete search history.

(56) References Cited

U.S. PATENT DOCUMENTS

| | | | |
|---|---|---|---|
| 4,152,129 A | | 5/1979 | Trentham et al. |
| 4,318,723 A | | 3/1982 | Holmes et al. |
| 4,441,900 A | * | 4/1984 | Swallow ................... C07C 7/09 |
| | | | 62/622 |
| 4,533,372 A | | 8/1985 | Valencia et al. |
| 4,710,213 A | | 12/1987 | Sapper et al. |
| 5,950,453 A | * | 9/1999 | Bowen ................... B23K 9/173 |
| | | | 62/612 |
| 6,053,007 A | * | 4/2000 | Victory ................... F25J 3/0209 |
| | | | 62/619 |
| 7,124,605 B2 | | 10/2006 | Parro et al. |
| 7,332,145 B2 | | 2/2008 | Chretien |
| 7,678,951 B2 | | 3/2010 | Chretien |

\* cited by examiner

PROCESS FOR TREATING A NATURAL GAS CONTAINING CARBON DIOXIDE

CROSS-REFERENCE TO RELATED APPLICATIONS

This application is a National Phase Entry of International Application No. PCT/IB2011/051879, filed on Apr. 28, 2011, which claims priority to French Patent Application Serial No. 1053340, filed on Apr. 29, 2010, both of which are incorporated by reference herein.

FIELD OF THE INVENTION

The present invention relates to a cryogenic-type process for treating natural gas, with the aim of removing at least some of the carbon dioxide that it contains, in which the hydrocarbons normally lost as a result of the cryogenic treatment are largely recovered. The invention also relates to a plant suitable for implementing this process.

BACKGROUND

Within the context of producing natural gas or liquefied natural gas, it is necessary to purify said natural gas, originating from deposits, of a certain number of contaminants, primarily acidic gases such as hydrogen sulphide ($H_2S$) and carbon dioxide ($CO_2$). In particular, carbon dioxide can represent a major part of the gaseous mixture originating from a deposit of natural gas, up to more than 70% (in molar concentration). Several processes are known in the field for making it possible to reduce the carbon dioxide content of the natural gas.

The most usual treatment is based on the use of amine solvents. This method makes possible a separation of the $CO_2$ that is very selective vis-à-vis hydrocarbons; it makes it possible to lower the concentration of $CO_2$ below the threshold of 50 ppm. But this method requires high energy to regenerate the solvent. As a result, it is unsuitable if the original gas has a high concentration of $CO_2$. Moreover, the regeneration is virtually atmospheric, and requires a compression that consumes a lot of energy if a reinjection of the separated $CO_2$ is envisaged (which is to be envisaged more and more routinely in view of the environmental issues).

Another type of treatment is based on the use of semipermeable membranes. The uses of these membranes for gases with an average $CO_2$ content have developed significantly in the last few years. Membrane treatment is advantageous for significant concentrations of $CO_2$ and for a certain range of "feed-to-retentate" partial pressure ratios. However, when the $CO_2$ specifications are relatively low, the associated losses of methane can become considerable. It is also possible to provide several stages of membranes for concentrating the $CO_2$ in the permeate, which makes it necessary to provide intermediate compressions of the permeate. The reinjection of the $CO_2$, if sought, requires an additional compression, from the low pressure of the final permeate, which further increases the energy bill for this type of process.

Cryogenic processes constitute another type of treatment. The higher the concentration of $CO_2$ in the original gas, the greater their advantage in terms of energy. An example of a cryogenic process is shown in U.S. Pat. No. 4,152,129. However, due to the possible crystallization of the $CO_2$ and/or the critical conditions at the head of the column, such a process does not allow stringent $CO_2$ requirements to be met. A finishing treatment, for example of the amines type, is therefore essential if a strict $CO_2$ specification is required.

Certain variants of cryogenic treatment have been presented more recently, in particular the process called "CFZ" ("Controlled Freeze Zone"), the particular feature of which is to allow a crystallization of the $CO_2$ in the problematic zone of the column, which makes it possible to envisage very high specifications with very low treatment temperatures (about −90° or even −110° C.). On this point, reference may be made for example to U.S. Pat. No. 4,533,372.

Another variant of cryogenic treatment has been developed by Cool Energy Limited. This process, called "Cryo-Cell", makes it possible, by means of a cryogenic separation step, to meet specifications of about 2 to 3% $CO_2$, starting from a gas pretreated by cryogenic distillation, or directly for crude gases with an average concentration of $CO_2$ (typically 25 to 35%). This process uses a liquefaction of the gas under pressure, then an expansion of the fluid which creates an intense cold and a partial crystallization of the $CO_2$. The liquid and solid fractions are recovered in a flask designed for certain methods of application, keeping the bottom temperature in the liquid range. WO 2007/030888, WO 2008/095258 and WO 2009/144275 illustrate this technique.

Another variant of cryogenic treatment is constituted by the family of so-called "Ryan Holmes" processes. These processes, which make possible a fairly complete recovery of the C3+ hydrocarbons, use 3 or 4 distillation columns, depending on the nature of the gas, and as a result prove to be relatively complex and costly in terms of investment and consumption.

A drawback of these cryogenic methods is that they separate the components according to their volatility and therefore, with the liquid $CO_2$, trap virtually all of the C3+ hydrocarbons contained in the natural gas. This constitutes a sometimes very great handicap depending on the composition of the gas. It is estimated that 8 to 15% by mass of the hydrocarbons are generally lost when a separation of the $CO_2$ by distillation is implemented; furthermore, the majority of the hydrocarbons lost are hydrocarbons with an intermediate molar mass, therefore the most valuable.

WO 99/01707 relates to a variant of the process called "CFZ", in which some of the stream of liquid $CO_2$ recovered at the foot of the distillation column is expanded, then used to cool the natural gas before it enters the distillation column in two successive heat exchangers. Between the two heat exchangers, the stream of $CO_2$ undergoes a gas/liquid separation, only the liquid portion being expanded then guided to the second heat exchanger (the gaseous portion being compressed before finally being removed). At the outlet of the second heat exchanger, another gas/liquid separation is provided: the gaseous phase is compressed before finally being removed, while the liquid phase provides a recovery of the condensates trapped in the stream of $CO_2$.

This technique makes it possible to limit the hydrocarbon losses in the stream of liquid $CO_2$ and could be applied to any process for cryogenically separating the $CO_2$ which traps C3+ hydrocarbons in the liquid $CO_2$. On the other hand, a drawback of the technique proposed in this document is that the composition of the stream (mostly $CO_2$) in the successive heat exchangers varies, the stream becoming progressively richer in heavy fractions. This leads to an increased risk of crystallization, in particular of the paraffinic hydrocarbons, and particularly in the last heat exchanger in the cold cycle, the temperature of which is the lowest. This is why the document provides the alternative of a rectification column for the natural gas at the inlet of the plant in order to avoid these problems, so as to remove some of the heavy compounds upstream. This method is extremely complex and difficult to implement, since it requires an additional fractionation of all of the gas.

There is therefore a real need to develop a treatment that makes it possible to effectively reduce the hydrocarbon losses for these types of cryogenic separation of $CO_2$, in a manner that is simple to implement.

SUMMARY

In the first place the invention relates to a process for treating a natural gas containing carbon dioxide in which:
- the natural gas is separated by a cryogenic process in order to provide, on the one hand, a stream of liquid carbon dioxide containing hydrocarbons and, on the other hand, purified natural gas;
- at least one part of the natural gas is cooled in a first heat exchanger then in a second heat exchanger before said cryogenic process and/or before a reflux to said cryogenic process;
- at least one part of the stream of liquid carbon dioxide is recovered in order to provide a stream of recycled carbon dioxide;
- the stream of recycled carbon dioxide is divided into a first portion and a second portion;
- the first portion is expanded then is heated in the first heat exchanger, in order to provide a first stream of heated carbon dioxide;
- the second portion is cooled, then at least one part of the second portion is expanded then is heated in the second heat exchanger, in order to provide a second stream of heated carbon dioxide;
- at least some of the hydrocarbons contained in the first stream of heated carbon dioxide and in the second stream of heated carbon dioxide are recovered by liquid/gas separation.

According to an embodiment:
- at least one part of the natural gas is cooled in a third heat exchanger before the cryogenic process and/or before a reflux to the cryogenic process;
- the second portion of the stream of recycled carbon dioxide is divided into a third portion and a fourth portion;
- the third portion is expanded then is heated in the second heat exchanger, in order to provide the second stream of heated carbon dioxide;
- the fourth portion is cooled then expanded, then it is heated in the third heat exchanger, in order to provide a third stream of heated carbon dioxide;
- at least some of the hydrocarbons contained in the third stream of heated carbon dioxide are recovered by liquid/gas separation.

According to an embodiment, the first heat exchanger, the second heat exchanger and, if applicable, the third heat exchanger operate at different temperatures, and preferably the first heat exchanger operates at a higher temperature than the second heat exchanger and, if applicable, the second heat exchanger operates at a higher temperature than the third heat exchanger. According to an embodiment, said cryogenic process is a distillation.

According to an embodiment:
- the cooling of the second portion of the stream of recycled carbon dioxide is carried out in the second heat exchanger;
- the cooling of the fourth portion of the stream of recycled carbon dioxide, if applicable, is carried out in the third heat exchanger; and
- preferably the stream of recycled carbon dioxide is cooled in the first heat exchanger before being divided into the first portion and the second portion.

According to an embodiment, the purified natural gas is heated, if applicable first in the third heat exchanger, then in the second heat exchanger, then in the first heat exchanger.

According to an embodiment:
- the first stream of heated carbon dioxide undergoes a liquid/gas separation in a first separation flask in order to provide a first gaseous phase and a first liquid phase;
- the first liquid phase is expanded;
- the second stream of heated carbon dioxide and the first expanded liquid phase undergo a liquid/gas separation in a second separation flask in order to provide a second gaseous phase and a second liquid phase; and, preferably:
- the second liquid phase is expanded;
- the third stream of heated carbon dioxide and the second expanded liquid phase undergo a liquid/gas separation in a third separation flask in order to provide a third gaseous phase and a third liquid phase.

According to an embodiment, the second liquid phase or, if applicable, the third liquid phase, undergoes a step of stabilizing the condensates in order to provide a liquid phase rich in hydrocarbons and a gaseous phase rich in carbon dioxide, said gaseous phase rich in carbon dioxide preferably undergoing a liquid/gas separation in the second separation flask or, if applicable, in the third separation flask.

According to an embodiment, the first gaseous phase, the second gaseous phase and, if applicable, the third gaseous phase are compressed and cooled in order to provide an outlet stream of carbon dioxide, which is optionally mixed with at least one part of the stream of liquid carbon dioxide.

According to an embodiment:
- one part of the second liquid phase is mixed with the second portion of the stream of recycled carbon dioxide or, if applicable, one part of the third liquid phase is mixed with the fourth portion of the stream of recycled carbon dioxide; and/or
- one part of the outlet stream of carbon dioxide is mixed with the stream of recycled carbon dioxide.

Another subject of the invention is a plant for treating natural gas containing carbon dioxide comprising:
- a cryogenic separation unit;
- at least one line for natural gas connected at the inlet of the cryogenic separation unit;
- a line for liquid carbon dioxide and a line for purified natural gas originating from the cryogenic separation unit;
- a first heat exchanger passed through by at least one of the lines for natural gas connected at the inlet of the cryogenic separation unit;
- a second heat exchanger passed through by at least one of the lines for natural gas connected at the inlet of the cryogenic separation unit or by a line for natural gas connected at the outlet of the cryogenic separation unit and feeding a reflux system;
- a line for recycled carbon dioxide originating from the line for liquid carbon dioxide;
- a line for the first portion and a line for the second portion originating from the line for recycled carbon dioxide, the line for the first portion being equipped with expansion means and then passing through the first heat exchanger;

the line for the second portion being equipped with cooling means;

a line for the third portion originating from the line for the second portion, said line for the third portion being equipped with expansion means and then passing through the second heat exchanger;

gas/liquid separation means fed by the line for the first portion and the line for the third portion.

According to an embodiment:

the plant comprises a third heat exchanger passed through by at least one of the lines for natural gas connected at the inlet of the cryogenic separation unit or by a line for natural gas connected at the outlet of the cryogenic separation unit and feeding a reflux system;

the line for the second portion divides into the line for the third portion and a line for the fourth portion;

the line for the fourth portion is equipped with cooling means, expansion means, and then passes through the third heat exchanger; and the plant comprises gas/liquid separation means fed by the line for the fourth portion.

According to an embodiment:

the cooling means on the line for the second portion are constituted by the second heat exchanger;

if applicable, the cooling means on the line for the fourth portion are constituted by the third heat exchanger; and preferably the line for recycled carbon dioxide is equipped with cooling means constituted by the first heat exchanger, before dividing into the line for the first portion and the line for the second portion.

According to an embodiment, the cryogenic separation unit is a distillation unit. According to an embodiment, the line for purified natural gas passes, if applicable, through the third heat exchanger, then the second heat exchanger, then the first heat exchanger.

According to an embodiment:

the gas/liquid separation means comprise a first separation flask and a second separation flask;

the first separation flask is fed by the line for the first portion;

a line for the first gaseous phase and a line for the first liquid phase are connected at the outlet of the first separation flask;

the line for the first liquid phase is equipped with expansion means;

the second separation flask is fed by the line for the third portion and by the line for the first liquid phase;

a line for the second gaseous phase and a line for the second liquid phase are connected at the outlet of the second separation flask; and preferably:

the line for the second liquid phase is equipped with expansion means;

the line for the fourth portion and the line for the second liquid phase feed a third separation flask;

a line for the third gaseous phase and a line for the third liquid phase are connected at the outlet of the third separation flask.

According to an embodiment, the line for the second liquid phase or, if applicable, the line for the third liquid phase, feeds a condensate stabilization unit, at the outlet of which a line for liquid phase rich in hydrocarbons and a line for gaseous phase rich in carbon dioxide are connected, said line for gaseous phase rich in carbon dioxide preferably feeding the second separation flask or, if applicable, the third separation flask. According to an embodiment, the line for the first gaseous phase, the line for the second gaseous phase and, if applicable, the line for the third gaseous phase feed compression means and join in an outlet line for carbon dioxide, said outlet line for carbon dioxide preferably being equipped with cooling means and preferably joining a line for non-recycled carbon dioxide originating from the line for liquid carbon dioxide, in order to form a line for final carbon dioxide.

According to an embodiment, the plant comprises:

an additional line for hydrocarbons equipped with pumping means, connected at the outlet of the second separation flask and returning to the line for the second portion upstream of the second heat exchanger or, if applicable, connected at the outlet of the third separation flask and returning to the line for the fourth portion upstream of the third heat exchanger; and/or an additional line for carbon dioxide equipped with a valve, reaching from the outlet line for carbon dioxide to the line for recycled carbon dioxide.

According to an embodiment, the process as described above is implemented in the above-mentioned plant.

The present invention makes it possible to overcome the drawbacks of the state of the art. More particularly it provides a treatment for natural gas whereby the carbon dioxide content can be significantly reduced. Said treatment is implemented while limiting the losses of hydrocarbons, in particular the C3+ compounds trapped with the stream of liquid carbon dioxide.

This is achieved, on the one hand, by recycling at least some of the carbon dioxide originating from a distillation (or more generally from a cryogenic process) and by using this carbon dioxide rich in C3+ as a refrigerant in an open refrigeration cycle in order to produce the frigories necessary for the cryogenic process, i.e. by making a heat exchange necessary (in several steps) between the carbon dioxide used in the open refrigeration cycle and the natural gas; on the other hand, by recovering the hydrocarbons trapped in the carbon dioxide from the open refrigeration cycle by a simple gas/liquid separation after the heat exchange with the natural gas, the composition of the stream of carbon dioxide from the open refrigeration cycle remaining constant during the different steps of said heat exchange.

According to certain particular embodiments, the invention also has one or preferably several of the advantageous characteristics listed below.

The invention does not require major new equipment compared with a plant equipped with a standard, closed-loop, cooling unit, optionally with the exception of the equipment for stabilizing the condensates.

The invention makes it possible to recover the $CO_2$ in liquid form at the end of the refrigeration cycle; it can then be pressurized by simple pumping for injection into geological structures (unlike the processes based on an amine solvent or on a semipermeable membrane).

The process of the invention is particularly useful and appropriate for a natural gas comprising an average or high $CO_2$ content and comprising a significant fraction of C3+ hydrocarbons.

The invention is particularly suitable for offshore applications, where the use of C2/C3 refrigerant, which is highly flammable, is not desirable for safety reasons.

The renewable nature of the refrigerant used according to the invention makes it possible to work with a minimum buffer stock, without fearing the consequences of multiple decompressions of the cycle. Thus the invention makes it possible to eliminate logistical problems with regard to the refrigerant.

The invention can make it possible to recover a significant fraction of heavy hydrocarbons (C3+). Thus, in the example provided below, the invention makes it possible to increase the production of hydrocarbons, in the form of highly valuable stabilized condensates, by approximately 3% by mass.

Compared with the process described in WO 99/01707, the invention has the advantage of limiting the risks of crystallization in the refrigeration cycle, linked to the concentration of heavy paraffinic hydrocarbons, and therefore of avoiding, in the vast majority of cases, the need for a fractionation of the natural gas upstream of the cryogenic process.

DETAILED DESCRIPTION

The invention will now be described in greater detail and in a non-limitative fashion in the following description. All pressures are given in absolute values. All percentages are given as molar values, unless otherwise indicated. The terms "upstream" and "downstream" refer to the direction of flow of the fluids in the plant.

Plant

Figure 1:
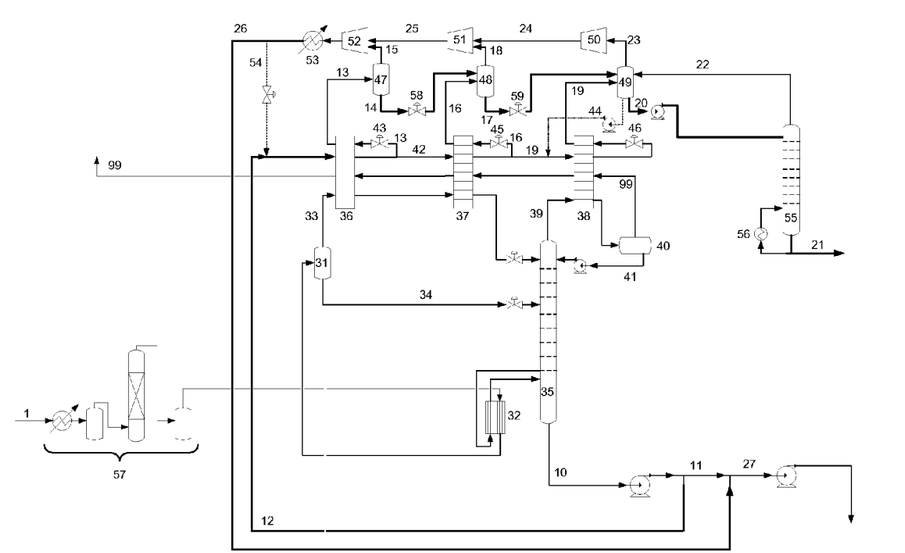
FIG. 1 diagrammatically shows an embodiment of a plant according to the invention.

With reference to FIG. 1, the plant according to the invention comprises a feed line for natural gas 1. This feed line for natural gas 1 preferably passes through a pretreatment unit 57, which can include pre-cooling means and/or dehydration means and/or gas/liquid separation means and/or fractionation means. It is preferred, for reasons of simplicity, that the plant be without fractionation means and deacidification means in the pretreatment unit 57.

The feed line for natural gas 1 feeds (indirectly) a cryogenic separation unit 35. By "cryogenic separation unit" is meant a set of means capable of separating carbon dioxide from methane with a supply of cold at an operating temperature below or equal to −40° C.

Preferably, the cryogenic separation unit 35 is a distillation unit and, more precisely, in the embodiment shown, it is a standard distillation column equipped with a reboiler 32 at the foot. Heat exchange means between the feed line for natural gas 1 and the reboiler 32 are provided; the feed line for natural gas 1 opens into a gas/liquid separator 31. Two lines for natural gas 33, 34, namely a line for gaseous fraction 33 and a line for liquid fraction 34, are connected at the outlet of the gas/liquid separator 31.

The line for gaseous fraction 33 and the line for liquid fraction 34 respectively open into the cryogenic separation unit 35, at different stages. Each of these two lines is equipped with expansion means; moreover, the line for gaseous fraction 33 passes successively through a first heat exchanger 36 and a second heat exchanger 37 before passing through the above-mentioned expansion means and opening into the cryogenic separation unit 35.

A line for liquid carbon dioxide 10 is connected at the foot of the cryogenic separation unit 35, and a line for natural gas 39, feeding a reflux system, is connected at the head of the cryogenic separation unit 35. More precisely, the line for natural gas 39 passes through a third heat exchanger 38 then feeds a gas/liquid separator 40. At the outlet of this gas/liquid separator 40, there are connected, at the foot on the one hand, a reflux line 41 equipped with pumping means and returning to the cryogenic separation unit 35 and, at the head on the other hand, a line for purified natural gas 99.

The line for purified natural gas 99 passes successively through the third heat exchanger 38, the second heat exchanger 37 and the first heat exchanger 36. On the diagram, the streams passing through the heat exchangers from left to right give off heat and the streams passing through the heat exchangers from right to left absorb heat. Thus, the cooling of the heat exchangers 36, 37, 38 is ensured by the line for purified natural gas 99 and by the open refrigeration cycle described below and containing a stream rich in carbon dioxide. The line for purified natural gas 99 can be followed by recompression means.

If necessary, additional treatment means (and in particular additional deacidification means) can be provided from the line for purified natural gas 99, if a finishing purification of the gas is necessary. Such additional treatment means (generally situated downstream of fractionation means) can comprise means for treating the carbon dioxide according to any one of the techniques known in the state of the art (for example scrubbing with amine solvent, separation by membrane, etc.). This can prove useful in the case of a gas comprising a very high $CO_2$ content.

Downstream, this line for purified natural gas 99 can be linked to the gas transport and/or distribution network, or feed a natural gas liquefaction unit. Moreover, the line for liquid carbon dioxide 10 divides into two branches, namely a line for non-recycled carbon dioxide 11 and a line for recycled carbon dioxide 12. The line for recycled carbon dioxide 12 passes through the first heat exchanger 36. Then it divides into two branches, namely a line for the first portion 13 and a line for the second portion 42. The line for the second portion 42 passes through the second heat exchanger 37 then itself divides into two branches, namely a line for the third portion 16 and a line for the fourth portion 19. The line for the fourth portion 19 passes through the third heat exchanger 38 a first time.

Expansion means 43 are provided on the line for the first portion 13, which then passes through the first heat exchanger 36, before feeding a first separation flask 47. Similarly, expansion means 45 are provided on the line for the third portion 16, which then passes through the second heat exchanger 37, before feeding a second separation flask 48. Finally, the line for the fourth portion 19 passes through the third heat exchanger 38 a second time, expansion means 46 being provided on the line for the fourth portion 19 between its two passages through the heat exchanger 38; finally, the line for the fourth portion 19 feeds a third separation flask 49.

The three separation flasks 47, 48, 49 are suitable for carrying out a liquid/gas separation and they are connected in cascade. In other words, at the outlet of the first separation flask 47 there are connected a line for the first gaseous phase 15 (at the head) and a line for the first liquid phase 14 (at the foot), said line for the first liquid phase 14 feeding the second separation flask 48 after having passed through expansion means 58; similarly, at the outlet of the second separation flask 48 there are connected a line for the second gaseous phase 18 (at the head) and a line for the second liquid phase 17 (at the foot), said line for the second liquid phase 17 feeding the third separation flask 49 after passing through expansion means 59. At the outlet of the third separation flask 49 there are connected a line for the third gaseous phase 23 (at the head) and a line for the third liquid phase 20 (at the foot).

The line for the third liquid phase 20 is equipped with pumping means and feeds a condensate stabilization unit 55. This condensate stabilization unit 55 can be a distillation column or, preferably, a distillation half-column, i.e. a column equipped with a reboiler 56 at the foot, but without a cooling and reflux system at the head.

At the outlet of the condensate stabilization unit 55 there are connected, on the one hand, a line for liquid phase rich in hydrocarbons 21 at the foot and a line for gaseous phase rich in carbon dioxide 22 at the head. The line for gaseous phase rich in carbon dioxide 22 returns to the third separation flask 49. The line for liquid phase rich in hydrocarbons 21 can open into treatment means (for example fractionation means) and/or means for storing condensates.

The line for the third gaseous phase 23 feeds a first compressor 50, at the outlet of which a first intermediate line 24 is connected. This first intermediate line 24 is joined by the line for the second gaseous phase 18, at the inlet of a second compressor 51. A second intermediate line 25 is connected at the outlet of the second compressor 51. This second intermediate line 25 is joined by the line for the first gaseous phase 15, at the inlet of a third compressor 52. An outlet line for carbon dioxide 26 is connected at the outlet of the third compressor 52.

The outlet line for carbon dioxide 26 is equipped with cooling means 53 and joins the line for non-recycled carbon dioxide 11 in order to form a line for final carbon dioxide 27. Pumping means can be provided on this. The line for final carbon dioxide 27 can open into downstream treatment means, for example means for injection into an underground formation.

Process

The natural gas which is treated by the process according to the invention is a gaseous mixture (which may contain a minority liquid fraction) comprising at least methane and $CO_2$. Preferably, this gaseous mixture comprises at least 5% methane, and generally at least 10% or at least 15% or at least 20% methane or at least 25% methane (molar proportions relative to the natural gas). Preferably, this gaseous mixture comprises at least 10% $CO_2$, and generally at least 20% $CO_2$ or at least 30% $CO_2$ or at least 40% $CO_2$ or at least 50% $CO_2$ or at least 60% $CO_2$ or at least 70% $CO_2$ (molar proportions relative to the natural gas). The natural gas also contains C3+ hydrocarbons (comprising at least 3 carbon atoms), preferably in a proportion by mass greater than or equal to 1% or 2% or 3% or 4% or 5% relative to the methane.

The natural gas optionally undergoes one or more preliminary treatments (in the pretreatment unit 57) with the aim of removing its solid contaminants or its liquid fraction, dehydrating it and/or pre-cooling it and/or reducing its hydrogen sulphide content. According to a preferred embodiment, the natural gas does not undergo any treatment with the specific aim of reducing its $CO_2$ content prior to the cryogenic separation. In the embodiment shown, the natural gas is first cooled by heat exchange in the reboiler 32 of the cryogenic separation unit 35, then it undergoes a separation into a gaseous phase and a liquid phase in the gas/liquid separator 31. These two phases are introduced at different stages of the cryogenic separation unit 35, after an expansion.

A stream of liquid carbon dioxide is recovered at the foot of the cryogenic separation unit 35 in the line for liquid carbon dioxide 10. By "stream of carbon dioxide" is meant, within the context of the present description, a mixture comprising mostly $CO_2$ and comprising a minority proportion of other compounds, in particular C3+ hydrocarbons.

The cooling needed to implement the cryogenic separation is ensured by the multi-stage open refrigeration cycle (at least two heat exchangers) which is fed by at least one part of the liquid carbon dioxide (stream of recycled carbon dioxide). In the embodiment shown, the refrigeration is carried out in the three heat exchangers 36, 37, 38 operating at decreasing temperatures, the heat exchangers 36 and 37 typically functioning at between −40° C. and 0° C., and the heat exchanger 38 typically functioning at between −60° C. and −45° C. (temperature of the refrigeration fluid after expansion). More precisely, the gaseous phase of the natural gas is cooled in the first heat exchanger 36 and the second heat exchanger 37.

The third heat exchanger 38 serves to cool the reflux of the cryogenic separation, i.e. to cool the stream of natural gas leaving the cryogenic separation unit 35 at the head. After this cooling, the stream of natural gas undergoes a separation in the gas/liquid separator 40 producing a stream of liquid phase which is pumped and returned to the cryogenic separation (reflux line 41), and a stream of purified natural gas which is recovered in the line for purified natural gas 99. In the embodiment shown, the stream of purified natural gas is heated in the three heat exchangers 38, 37, 36 successively, which makes it possible to recover the frigories available therein.

With regard to the functioning of the refrigeration cycle, the stream of recycled carbon dioxide undergoes a first cooling in the first heat exchanger 36, then it is divided into two liquid streams, namely a first portion and a second portion. The first portion is cooled by expansion, and it then returns to the first heat exchanger 36, in which it absorbs heat originating from the natural gas upstream of the cryogenic separation (and also heat originating from the stream of recycled carbon dioxide before expansion). The second portion undergoes a second cooling in the second heat exchanger 37, then it is divided into two liquid streams, namely a third portion and a fourth portion. The third portion is cooled by expansion, and it then returns to the second heat exchanger 37, in which it absorbs heat originating from the natural gas upstream of the cryogenic separation (and also heat originating from the stream of recycled carbon dioxide before expansion). The fourth portion undergoes a third cooling in the third heat exchanger 38, then it is cooled by expansion, and it then returns to the third heat exchanger 38, in which it absorbs heat originating from the natural gas at the level of the reflux of the cryogenic separation (and also heat originating from the stream of recycled carbon dioxide before expansion).

A first, second and third stream of heated carbon dioxide are therefore recovered at the outlet of the first, second and third heat exchanger 36, 37, 38 respectively. A significant part of the C3+ hydrocarbons contained in these streams is recovered by liquid/gas separation carried out on these streams. The liquid/gas separation is carried out by means of the first, second and third separation flasks 47, 48, 49, operating at decreasing pressures. The typical operating pressures are 10 bar to 40 bar for the separation flasks 47 and 48, and bar to 10 bar for the separation flask 49.

Each separation flask (respectively the first, second or third) produces a liquid phase (respectively the first, second or third) and a gaseous phase (respectively the first, second or third). The heavy hydrocarbons (essentially C4+) are mostly in the liquid phase. The first liquid phase is expanded and sent to the second separation flask 48 operating at a lower pressure than the first, and similarly the second liquid phase is expanded and sent to the third separation flask 49 operating at a lower pressure than the second. Thus, the heavy hydrocarbons trapped in the stream of $CO_2$ tend to concentrate in the bottom of the third separation flask 49 functioning at the lowest pressure, where they can easily be recovered in the third liquid phase.

An additional purification step (stabilization of the condensates) can be implemented, as shown, by means of the condensate stabilization column 55. A liquid phase rich in hydrocarbons is recovered at the foot thereof and a gaseous phase rich in carbon dioxide, which is returned to the separation flask at the lowest pressure, is recovered at the head. Each gaseous phase originating from the different separation flasks, depleted of heavy hydrocarbons, is compressed; these different gaseous phases are mixed, then the mixture is cooled and advantageously combined with the part of the liquid $CO_2$ that is not recycled for refrigeration. The stream of final liquid $CO_2$ can be pumped and injected into an underground formation, or else be used or otherwise turned to account.

Variants

The plant according to the invention and the process according to the invention can be varied from the embodiment described above in several ways. For example, it is possible to provide an additional line for carbon dioxide 54 equipped with a valve reaching from the outlet line for carbon dioxide 26 (typically downstream of the cooling means 53) to the line for recycled carbon dioxide 12. This characteristic makes it possible to compensate for any lack of refrigerant in the multi-stage refrigeration system, making it possible to recycle part of the $CO_2$ stream used for the refrigeration.

It is also possible to provide an additional line for hydrocarbons 44 (optionally equipped with a valve) connected at the outlet of the third separation flask 49 at the foot, equipped with pumping means and returning to the line for the fourth portion 19, upstream of the first passage into the third heat exchanger 38. Thus, part of the third liquid phase can be recycled in the $CO_2$ stream used for the refrigeration. This characteristic makes it possible to avoid any risk of crystallization at the coldest point, while enriching the expanded stream passing through the third heat exchanger 38 with hydrocarbons.

Moreover, the above description was made in relation to an open refrigeration cycle with three stages. This is the variant that makes an optimum functioning of the system possible. However, it is also possible to provide a cycle with two stages or, alternatively, with four or more stages.

In the case of a system with two stages, compared with the above description: the third heat exchanger 38 and the third separation flask 49 are omitted, as are the associated components, namely the line for the fourth portion 19, the line for the third gaseous phase 23, the first compressor 50 and the first intermediate line 24. The line for the second liquid phase 17 then merges with the line for the third liquid phase 20 and therefore directly feeds the condensate stabilization unit 55.

In the case of a system with four or more stages, compared with the above description, at least one additional heat exchanger (suitable for cooling the natural gas upstream of the cryogenic separation unit or in the reflux of the latter) and at least one additional separation flask are added; at least one additional division of the line originating from the line for recycled carbon dioxide 12, equipped with expansion means and feeding the additional separation flask are also added; and, at the outlet of the (or of each) additional separation flask, there are provided an additional line for gaseous phase, associated with an additional compressor, and an additional line for liquid phase, equipped with expansion means and feeding the following separation flask (i.e. operating at lower pressure).

Moreover, in the embodiment shown, the line for natural gas 33 passing into the first heat exchanger 36 and the second heat exchanger 37 originates from the gas/liquid separator 31 and feeds the cryogenic separation unit 35; and the natural gas line 39 passing into the third heat exchanger 38 forms part of the reflux system of the cryogenic separation unit 35, since it originates from the head of the cryogenic separation unit 35 and feeds the gas/liquid separator 40 to which the reflux line 41 is connected at the foot. However, this distribution can be modified according to, on the one hand, the number of heat exchangers and, on the other hand, the operating parameters of the plant.

For example, the line for natural gas 33 originating from the gas/liquid separator 31 and feeding the cryogenic separation unit 35 can pass through a single heat exchanger (in particular if the refrigeration cycle comprises only two heat exchangers, in which case the second heat exchanger can be associated with the reflux system of the cryogenic separation unit 35). Conversely, this line for natural gas 33 can pass through more than two heat exchangers. Another variant is for all of the heat exchangers to be associated with the line for natural gas 33 originating from the gas/liquid separator 31 and feeding the cryogenic separation unit 35, in which case the reflux system of the cryogenic separation unit 35 is equipped with additional cooling means (replacing the third heat exchanger described above).

The cryogenic separation unit 35 can be a standard distillation column, suitable for the cryogenic separation of $CO_2$, as described above. But it can also be a distillation column suitable for functioning under solids-forming conditions ("CFZ"-type column, such as described for example in U.S. Pat. No. 4,533,372 or WO 99/01707). The cryogenic separation unit 35 can also comprise liquefaction means suitable for liquefying the gas under pressure, means for expanding the fluid suitable for creating an intense cold and a partial crystallization of the $CO_2$, and means for recovering a liquid fraction and a solid fraction comprising a flask suitable for maintaining a bottom temperature in the liquid range ("cryocell"-type distillation unit as described for example in WO 2007/030888, WO 2008/095258 and WO 2009/144275). In this case, it is advantageous to provide a stabilization column on the line for liquid carbon dioxide 10, suitable for recovering the light hydrocarbons (in particular methane) present in the liquid $CO_2$.

EXAMPLE

The following example illustrates the invention without limiting it. A numerical simulation was carried out in order to characterize the functioning of a plant corresponding to FIG. 1. Tables 1a, 1b, 1c, 1d, 2a, 2b, 2c and 2d below give the composition of the starting natural gas as well as the flow rates obtained and the composition of the stream obtained in different lines of the plant. The conditions in lines 13, 16, 19 were recorded at the outlet of the respective heat exchangers 36, 37, 38. The conditions in lines 14, 17, 20 were recorded at the outlet of the respective separation flasks 47, 48, 49 and before expansion or pumping. The conditions in line 10 were recorded before pumping.

TABLE 1a general data and molar data

| | Line of the plant | | | | |
|---|---|---|---|---|---|
| | 1 | 99 | 10 | 11 | 12 |
| Liquid (L) or gaseous (G) state | G + L | G + L | L | L | L |
| Temperature (° C.) | | | 4.741 | 9.948 | 9.948 |
| Pressure (bar) | | | 40.680 | 80.000 | 80.000 |
| Molecular weight | 35.485 | 21.904 | 43.878 | 43.878 | 43.878 |
| Flow rate (kmol/h) | 35260.954 | 12067.202 | 23168.041 | 35.100 | 23132.941 |
| Composition (mole %) | | | | | |
| $N_2$ | 0.50 | 1.46 | 0.00 | 0.00 | 0.00 |
| $CO_2$ | 71.00 | 20.00 | 97.53 | 97.53 | 97.53 |
| $H_2S$ | 0.50 | 0.10 | 0.71 | 0.71 | 0.71 |
| Methane | 27.00 | 77.93 | 0.50 | 0.50 | 0.50 |
| Ethane | 0.60 | 0.49 | 0.66 | 0.66 | 0.66 |
| Propane | 0.20 | 0.02 | 0.29 | 0.29 | 0.29 |
| Heptane | 0.20 | 0.00 | 0.30 | 0.30 | 0.30 |

TABLE 1b general data and molar data (continued)

| | Line of the plant | | | | |
|---|---|---|---|---|---|
| | 13 | 14 | 15 | 16 | 17 |
| Liquid (L) or gaseous (G) state | G + L | L | G | G + L | L |
| Temperature (° C.) | 6.891 | 6.637 | 6.637 | −11.001 | −11.425 |
| Pressure (bar) | 27.626 | 27.426 | 27.426 | 13.723 | 13.520 |
| Molecular weight | 43.878 | 66.018 | 43.790 | 43.878 | 75.424 |
| Flow rate (kmol/h) | 12435.033 | 49.604 | 12385.430 | 8522.613 | 70.771 |
| Composition (mole %) | | | | | |
| $N_2$ | 0.00 | 0.00 | 0.00 | 0.00 | 0.00 |
| $CO_2$ | 97.53 | 57.83 | 97.69 | 97.53 | 41.85 |
| $H_2S$ | 0.71 | 0.77 | 0.71 | 0.71 | 0.61 |
| Methane | 0.50 | 0.08 | 0.50 | 0.50 | 0.05 |
| Ethane | 0.66 | 0.51 | 0.66 | 0.66 | 0.31 |
| Propane | 0.29 | 1.34 | 0.29 | 0.29 | 1.08 |
| Heptane | 0.30 | 39.47 | 0.15 | 0.30 | 56.11 |

TABLE 1c general data and molar data (continued)

| | Line of the plant | | | | |
|---|---|---|---|---|---|
| | 18 | 19 | 20 | 21 | 22 |
| Liquid (L) or gaseous (G) state | G | G + L | L | L | G |
| Temperature (° C.) | −11.425 | −33.026 | −32.595 | 168.547 | −30.301 |
| Pressure (bar) | 13.520 | 5.677 | 5.477 | 6.000 | 6.000 |
| Molecular weight | 43.745 | 43.878 | 82.729 | 99.655 | 43.780 |
| Flow rate (kmol/h) | 8501.446 | 2175.294 | 66.255 | 46.184 | 20.071 |
| Composition (mole %) | | | | | |
| $N_2$ | 0.00 | 0.00 | 0.00 | 0.00 | 0.00 |
| $CO_2$ | 97.77 | 97.53 | 29.50 | 0.00 | 97.38 |
| $H_2S$ | 0.71 | 0.71 | 0.46 | 0.00 | 1.51 |
| Methane | 0.50 | 0.50 | 0.02 | 0.00 | 0.08 |
| Ethane | 0.66 | 0.66 | 0.16 | 0.00 | 0.53 |
| Propane | 0.29 | 0.29 | 0.82 | 0.98 | 0.47 |
| Heptane | 0.07 | 0.30 | 69.03 | 99.02 | 0.03 |

TABLE 1d general data and molar data (continued)

| | Line of the plant | | | | |
|---|---|---|---|---|---|
| | 23 | 24 | 25 | 26 | 27 |
| Liquid (L) or gaseous (G) state | G | G | G | L | L |
| Temperature (° C.) | −32.595 | 40.028 | 61.729 | 33.000 | 32.988 |
| Pressure (bar) | 5.477 | 13.520 | 27.926 | 80.000 | 80.000 |
| Molecular weight | 43.722 | 43.722 | 43.740 | 43.767 | 43.767 |
| Flow rate (kmol/h) | 2199.881 | 2199.881 | 10701.327 | 23086.758 | 23121.857 |
| Composition (mole %) | | | | | |
| $N_2$ | 0.00 | 0.00 | 0.00 | 0.00 | 0.00 |
| $CO_2$ | 97.79 | 97.79 | 97.77 | 97.73 | 97.73 |
| $H_2S$ | 0.72 | 0.72 | 0.71 | 0.71 | 0.71 |
| Methane | 0.50 | 0.50 | 0.50 | 0.50 | 0.50 |
| Ethane | 0.66 | 0.66 | 0.66 | 0.66 | 0.66 |
| Propane | 0.30 | 0.30 | 0.29 | 0.29 | 0.29 |
| Heptane | 0.03 | 0.03 | 0.06 | 0.11 | 0.11 |

TABLE 2a data by mass

| Line of the plant | 1 | 99 | 10 | 11 | 12 |
|---|---|---|---|---|---|
| Flow rate (kg/h) | 1282025.1 | 264320.9 | 1016579.3 | 1540.1 | 1015039.2 |
| Composition (% by mass) | | | | | |
| $N_2$ | 0.39 | 1.87 | 0.00 | 0.00 | 0.00 |
| $CO_2$ | 85.94 | 40.18 | 97.83 | 97.83 | 97.83 |
| $H_2S$ | 0.47 | 0.16 | 0.55 | 0.55 | 0.55 |
| Methane | 11.91 | 57.08 | 0.18 | 0.18 | 0.18 |
| Ethane | 0.50 | 0.67 | 0.45 | 0.45 | 0.45 |
| Propane | 0.24 | 0.05 | 0.29 | 0.29 | 0.29 |
| Heptane | 0.55 | 0.00 | 0.70 | 0.70 | 0.70 |

TABLE 2b data by mass (continued)

| Line of the plant | 13 | 14 | 15 | 16 | 17 |
|---|---|---|---|---|---|
| Flow rate (kg/h) | 545630.8 | 3274.8 | 542356.1 | 373959.6 | 5337.8 |
| Composition (% by mass) | | | | | |
| $N_2$ | 0.00 | 0.00 | 0.00 | 0.00 | 0.00 |
| $CO_2$ | 97.83 | 38.55 | 98.18 | 97.83 | 24.42 |
| $H_2S$ | 0.55 | 0.40 | 0.55 | 0.55 | 0.27 |
| Methane | 0.18 | 0.02 | 0.18 | 0.18 | 0.01 |
| Ethane | 0.45 | 0.23 | 0.45 | 0.45 | 0.12 |
| Propane | 0.29 | 0.89 | 0.29 | 0.29 | 0.63 |
| Heptane | 0.70 | 59.90 | 0.34 | 0.70 | 74.54 |

TABLE 2c data by mass (continued)

| Line of the plant | 18 | 19 | 20 | 21 | 22 |
|---|---|---|---|---|---|
| Flow rate (kg/h) | 371896.6 | 95448.7 | 5481.2 | 4602.5 | 878.7 |
| Composition (% by mass) | | | | | |
| $N_2$ | 0.00 | 0.00 | 0.00 | 0.00 | 0.00 |
| $CO_2$ | 98.36 | 97.83 | 15.69 | 0.00 | 97.89 |
| $H_2S$ | 0.55 | 0.55 | 0.19 | 0.00 | 1.17 |
| Methane | 0.18 | 0.18 | 0.00 | 0.00 | 0.03 |
| Ethane | 0.46 | 0.45 | 0.06 | 0.00 | 0.36 |
| Propane | 0.29 | 0.29 | 0.44 | 0.43 | 0.47 |
| Heptane | 0.16 | 0.70 | 83.62 | 99.57 | 0.07 |

TABLE 2d data by mass (continued)

| Line of the plant | 23 | 24 | 25 | 26 | 27 |
|---|---|---|---|---|---|
| Flow rate (kg/h) | 96184.0 | 96184.0 | 468080.6 | 1010436.7 | 1011976.8 |
| Composition (% by mass) | | | | | |
| $N_2$ | 0.00 | 0.00 | 0.00 | 0.00 | 0.00 |
| $CO_2$ | 98.43 | 98.43 | 98.37 | 98.27 | 98.27 |
| $H_2S$ | 0.56 | 0.56 | 0.55 | 0.55 | 0.55 |
| Methane | 0.18 | 0.18 | 0.18 | 0.18 | 0.18 |
| Ethane | 0.46 | 0.46 | 0.46 | 0.45 | 0.45 |
| Propane | 0.31 | 0.31 | 0.30 | 0.29 | 0.29 |
| Heptane | 0.06 | 0.06 | 0.14 | 0.24 | 0.25 |

It is noted in this example that only 10% of the C7 hydrocarbons (representing the heavy paraffins) present in the liquid $CO_2$ pass through the coldest heat exchanger. This illustrates the impact of the process, compared with the state of the art, where a cascade refrigeration cycle would collect all of the heavy paraffins in the coldest heat exchanger.

The invention claimed is:

1. A process for treating a natural gas containing carbon dioxide, the process comprising:
   separating the natural gas by a cryogenic process in order to provide a stream of liquid carbon dioxide containing hydrocarbons and purified natural gas;
   cooling at least one part of the natural gas:
      (a) in a first heat exchanger,
      (b) then in a second heat exchanger before the cryogenic process or before a reflux to the cryogenic process;
   recovering at least one part of the stream of liquid carbon dioxide in order to provide a stream of recycled carbon dioxide;
   dividing the stream of recycled carbon dioxide into a first portion and a second portion;
   expanding and then heating the first portion in the first heat exchanger, in order to provide a first stream of heated carbon dioxide;
   cooling the second portion, then expanding and then heating at least one part of the second portion in the second heat exchanger, in order to provide a second stream of heated carbon dioxide; and
   recovering at least some of the hydrocarbons contained in the first stream of heated carbon dioxide and in the second stream of heated carbon dioxide by liquid/gas separation;
   the first stream of heated carbon dioxide undergoing a liquid/gas separation in a first separation flask in order to provide a first gaseous phase and a first liquid phase;
   expanding the first liquid phase; and
   the second stream of heated carbon dioxide and the first expanded liquid phase undergoing a liquid/gas separation in a second separation flask in order to provide a second gaseous phase and a second liquid phase.

2. The process according to claim 1, further comprising:
   cooling at least one part of the natural gas in a third heat exchanger before the cryogenic process or before a reflux to the cryogenic process;
   dividing the second portion of the stream of recycled carbon dioxide into a third portion and a fourth portion;
   expanding then heating the third portion in the second heat exchanger, in order to provide the second stream of heated carbon dioxide;
   cooling then expanding the fourth portion, then heating the expanded fourth portion in the third heat exchanger, in order to provide a third stream of heated carbon dioxide; and
   recovering at least some of the hydrocarbons contained in the third stream of heated carbon dioxide by liquid/gas separation.

3. The process according to claim 1, further comprising operating the first heat exchanger and the second heat exchanger at different temperatures.

4. The process according to claim 3, further comprising operating the first heat exchanger at a higher temperature than the second heat exchanger.

5. The process according to claim 1, wherein the cryogenic process is a distillation.

6. The process according to claim 1, wherein:
   the cooling of the second portion of the stream of recycled carbon dioxide is carried out in the second heat exchanger.

7. The process according to claim 6, further comprising cooling the stream of recycled carbon dioxide in the first heat exchanger before being divided into the first portion and the second portion.

8. The process according to claim 1, wherein the purified natural gas is heated, first in the second heat exchanger, then the first heat exchanger.

9. The process according to claim 1, further comprising:
expanding the second liquid phase; and
a third stream of heated carbon dioxide and the second expanded liquid phase undergoing a liquid/gas separation in a third separation flask in order to provide a third gaseous phase and a third liquid phase.

10. The process according to claim 1, further comprising stabilizing the condensate of the second liquid phase in order to provide a liquid phase rich in hydrocarbons and a gaseous phase rich in carbon dioxide.

11. The process according to claim 10, wherein the gaseous phase rich in carbon dioxide undergoes a liquid/gas separation in the second separation flask.

12. The process according to claim 1, further comprising compressing and cooling the first gaseous phase and the second gaseous phase in order to provide an outlet stream of carbon dioxide.

13. The process according to one of claim 1 further comprising at least one of:
mixing one part of the second liquid phase with the second portion of the stream of recycled carbon dioxide; and
mixing one part of an outlet stream of carbon dioxide with the stream of recycled carbon dioxide.

14. A process for treating natural gas implemented in a plant, comprising:
using a cryogenic separation unit;
using at least one line for natural gas connected at the inlet of the cryogenic separation unit;
using a line for liquid carbon dioxide and a line for purified natural gas originating from the cryogenic separation unit;
using a first heat exchanger passed through by at least one of the lines for natural gas connected at the inlet of the cryogenic separation unit;
using a second heat exchanger passed through by at least one of the lines for natural gas connected at the inlet of the cryogenic separation unit or by a line for natural gas connected at the outlet of the cryogenic separation unit and feeding a reflux system;
using a line for recycled carbon dioxide originating from the line for liquid carbon dioxide;
using a line for a first portion and a line for a second portion originating from the line for recycled carbon dioxide,
(a) the line for the first portion being equipped with an expander and then passing through the first heat exchanger;
(b) the line for the second portion being equipped with a cooler;
using a line for a third portion originating from the line for the second portion, the line for the third portion being equipped with an expander and then passing through the second heat exchanger; and
using a gas/liquid separator fed by the line for the first portion and the line for the third portion;
separating the natural gas by a cryogenic process in order to provide a stream of liquid carbon dioxide containing hydrocarbons and purified natural gas;
cooling at least one part of the natural gas;
(a) in the first heat exchanger,
(b) then in the second heat exchanger before the cryogenic process or before the reflux to the cryogenic process;
recovering at least one part of the stream of liquid carbon dioxide in order to provide a stream of recycled carbon dioxide;
dividing the stream of recycled carbon dioxide into the first portion and the second portion;
expanding and then heating the first portion in the first heat exchanger, in order to provide a first stream of heated carbon dioxide;
cooling the second portion, then expanding and then heating at least one part of the second portion in the second heat exchanger, in order to provide a second stream of heated carbon dioxide; and
recovering at least some of the hydrocarbons contained in the first stream of heated carbon dioxide and in the second stream of heated carbon dioxide by liquid/gas separation;
the first stream of heated carbon dioxide undergoing a liquid/gas separation in a first separation flask in order to provide a first gaseous phase and a first liquid phase;
expanding the first liquid phase; and
the second stream of heated carbon dioxide and the first expanded liquid phase undergoing a liquid/gas separation in a second separation flask in order to provide a second gaseous phase and a second liquid phase.

* * * * *